United States Patent
Towfiq et al.

(10) Patent No.: US 10,931,557 B2
(45) Date of Patent: Feb. 23, 2021

(54) HIGH-VOLUME WIRELESS DEVICE TESTING

(71) Applicant: Promptlink Communications, Inc., Oceanside, CA (US)

(72) Inventors: Foad Towfiq, Vista, CA (US); Adib Towfiq, Vista, CA (US); Alexander Podarevsky, Oceanside, CA (US); Antonin Shtikhlaytner, Kiev (UA)

(73) Assignee: Promptlink Communications, Inc., Oceanside, CA (US)

( * ) Notice: Subject to any disclaimer, the term of this patent is extended or adjusted under 35 U.S.C. 154(b) by 125 days.

(21) Appl. No.: 14/544,387

(22) Filed: Dec. 31, 2014

(65) Prior Publication Data
US 2019/0097910 A1   Mar. 28, 2019

(51) Int. Cl.
*H04L 12/26* (2006.01)
*H04W 24/08* (2009.01)
*H04M 1/24* (2006.01)

(52) U.S. Cl.
CPC .............. *H04L 43/50* (2013.01); *H04M 1/24* (2013.01); *H04W 24/08* (2013.01)

(58) Field of Classification Search
CPC ......... H04L 43/00; H04L 43/08; H04L 43/50; H04L 2012/5628; H04W 24/08; H04W 24/06; H04W 24/00–10; G06F 11/2733; G06F 11/3672; G06F 11/3696; G06F 2217/14; G06F 11/22–28; G06F 2217/034
See application file for complete search history.

(56) References Cited

U.S. PATENT DOCUMENTS

| | | | | |
|---|---|---|---|---|
| 4,450,335 A | * | 5/1984 | Shimizu | H05B 6/6417 219/714 |
| 7,058,559 B1 | * | 6/2006 | Roeck | H04L 41/145 375/222 |
| 7,894,349 B2 | * | 2/2011 | Breed | H04L 43/50 370/241 |
| 9,755,766 B2 | * | 9/2017 | Wadell | H04B 17/0085 |
| 2005/0240852 A1 | * | 10/2005 | Inaba | G01R 31/3167 714/740 |
| 2006/0101495 A1 | * | 5/2006 | Yoshida | H04L 12/2801 725/78 |
| 2009/0092053 A1 | * | 4/2009 | Olgaard | G01R 31/31715 370/241 |

(Continued)

*Primary Examiner* — Warner Wong
(74) *Attorney, Agent, or Firm* — Dentons US LLP

(57) ABSTRACT

A system includes a customer premises equipment (CPE) testing platform, a CPE testing rack, enclosures, and wireless components. The CPE testing rack is communicatively connected to the CPE testing platform and receptive to communication with wireless CPE devices. The enclosures are communicatively connected to the CPE testing rack. Each enclosure has wireless shielding to reduce outside wireless interference from entering the enclosure and to reduce wireless signals within the enclosure from exiting the enclosure. Each enclosure is receptive to installation therein a corresponding wireless CPE device. The wireless components are communicatively connected to the CPE testing platform. Each wireless component is mounted within a corresponding enclosure to wirelessly communicate with the corresponding wireless CPE device installed within the corresponding enclosure.

16 Claims, 2 Drawing Sheets

(56) References Cited

U.S. PATENT DOCUMENTS

| | | | | |
|---|---|---|---|---|
| 2009/0168658 | A1* | 7/2009 | Russell | H04L 43/50 370/251 |
| 2010/0261431 | A1* | 10/2010 | Olgaard | G01R 31/31713 455/67.11 |
| 2011/0069624 | A1* | 3/2011 | Olgaard | H04L 12/56 370/252 |
| 2012/0226462 | A1* | 9/2012 | Rucker | G06F 11/2294 702/108 |
| 2013/0007520 | A1* | 1/2013 | Giammarresi | G06F 11/2294 714/32 |
| 2013/0093447 | A1* | 4/2013 | Nickel | H04W 24/06 324/750.16 |
| 2013/0238308 | A1* | 9/2013 | Grosso | H04B 3/40 703/13 |
| 2014/0233405 | A1* | 8/2014 | Olgaard | H04L 43/50 370/252 |
| 2014/0256268 | A1* | 9/2014 | Olgaard | H04B 17/0085 455/67.13 |
| 2018/0146384 | A1* | 5/2018 | Towfiq | H04L 41/0843 |
| 2020/0015104 | A1* | 1/2020 | Towfiq | H04L 67/303 |

* cited by examiner

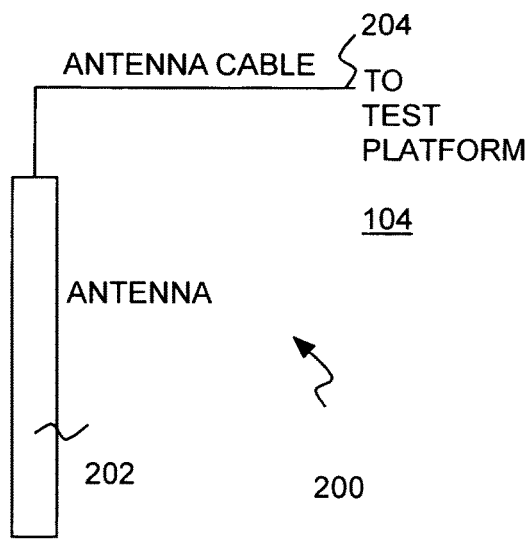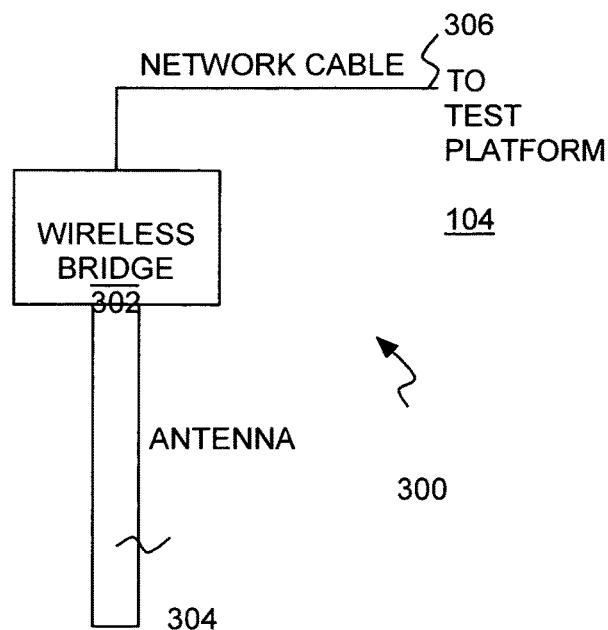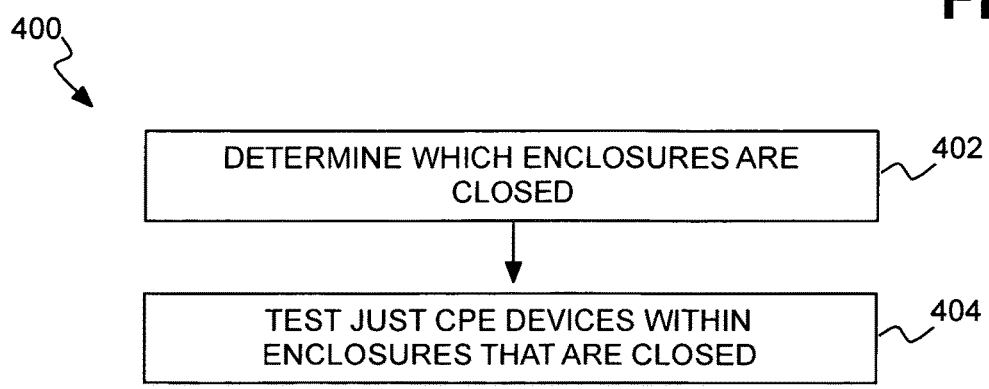

HIGH-VOLUME WIRELESS DEVICE TESTING

RELATED APPLICATIONS

The present patent application is a continuation in part of the patent application entitled "High-volume wireless device testing" filed on May 15, 2014 and assigned application Ser. No. 14/278,028, all of which are hereby incorporated by reference in their entirety.

BACKGROUND

Service providers, such as communications, connectivity, and content service providers, provide multimedia services, such as video, audio, telephony, data communications, wireless networking and related services to their subscribers by deploying devices at their customers' premises, and then connecting this equipment to the service provider's network and infrastructure. The deployed devices are generally referred to as customer premise equipment (CPE). For example, cable companies, more commonly known as multiple system operators (MSOs), deliver their service to customers by connecting a device, such as a set-top box, cable modem, or wireless gateway, to their network, and this CPE device acts as the service delivery mechanism for the subscriber.

The logistics of managing deployment of CPE devices may be an operational business process for some service providers, such as Internet service providers (ISPs), wireless network providers, MSOs, satellite television (TV) companies, digital subscriber loop (DSL) vendors, telecommunications companies, and so on. Providers acquire large numbers of CPE devices each year to use for delivering their subscription services to their customers. CPE devices may include TV set-top boxes, cable modems, embedded multimedia terminal adapters (EMTAs), wireless gateways, DSL modems, and devices that combine any of these capabilities in an integrated package. Thus, large quantities of CPE devices are deployed, or re-deployed, and therefore, they should be functionally tested, including wirelessly tested, before they go to customers.

SUMMARY

An example system includes a customer premises equipment (CPE) testing platform communicatively connected to the CPE testing rack and receptive to communication with wireless CPE devices. The system includes enclosures communicatively connected to the CPE testing rack. Each enclosure has wireless shielding to reduce outside wireless interference from entering the enclosure and to reduce wireless signals within the enclosure from exiting the enclosure. Each enclosure receptive to installation therein a corresponding wireless CPE device. The system includes wireless components communicatively connected to the CPE testing platform. Each wireless component is mounted within a corresponding enclosure to wirelessly communicate with the corresponding wireless CPE device installed within the corresponding enclosure.

An example apparatus includes an enclosure receptive to installation of a CPE device therein. The apparatus includes wireless shielding to reduce outside wireless interference from entering the enclosure and to reduce wireless signals within the enclosure from exiting the enclosure. The apparatus includes a wireless component mounted within the enclosure to wirelessly communicate with the wireless CPE device installed within the enclosure.

An example method includes determining which of a number of enclosures are closed. Wireless CPE devices are installed within the enclosures. The enclosures are wirelessly shielded and wireless components are mounted inside. The wireless CPE devices that are within the enclosures that are closed are to-be-tested CPE devices. The method includes testing, by a CPE testing platform, just the to-be-tested CPE devices and not other of the CPE devices, by communicating with just the to-be-tested CPE devices and not other of the CPE devices via the CPE testing rack, and by communicating with just the wireless components within the enclosures that are closed and not with other of the wireless components.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

FIG. 2 is a diagram of an example wireless component for use within the system of FIG. 1.

FIG. 3 is a diagram of another example wireless component for use within the system of FIG. 1.

FIG. 4 is a flowchart of an example method for testing CPE devices in conjunction with the system of FIG. 1.

DETAILED DESCRIPTION

Figure 1:
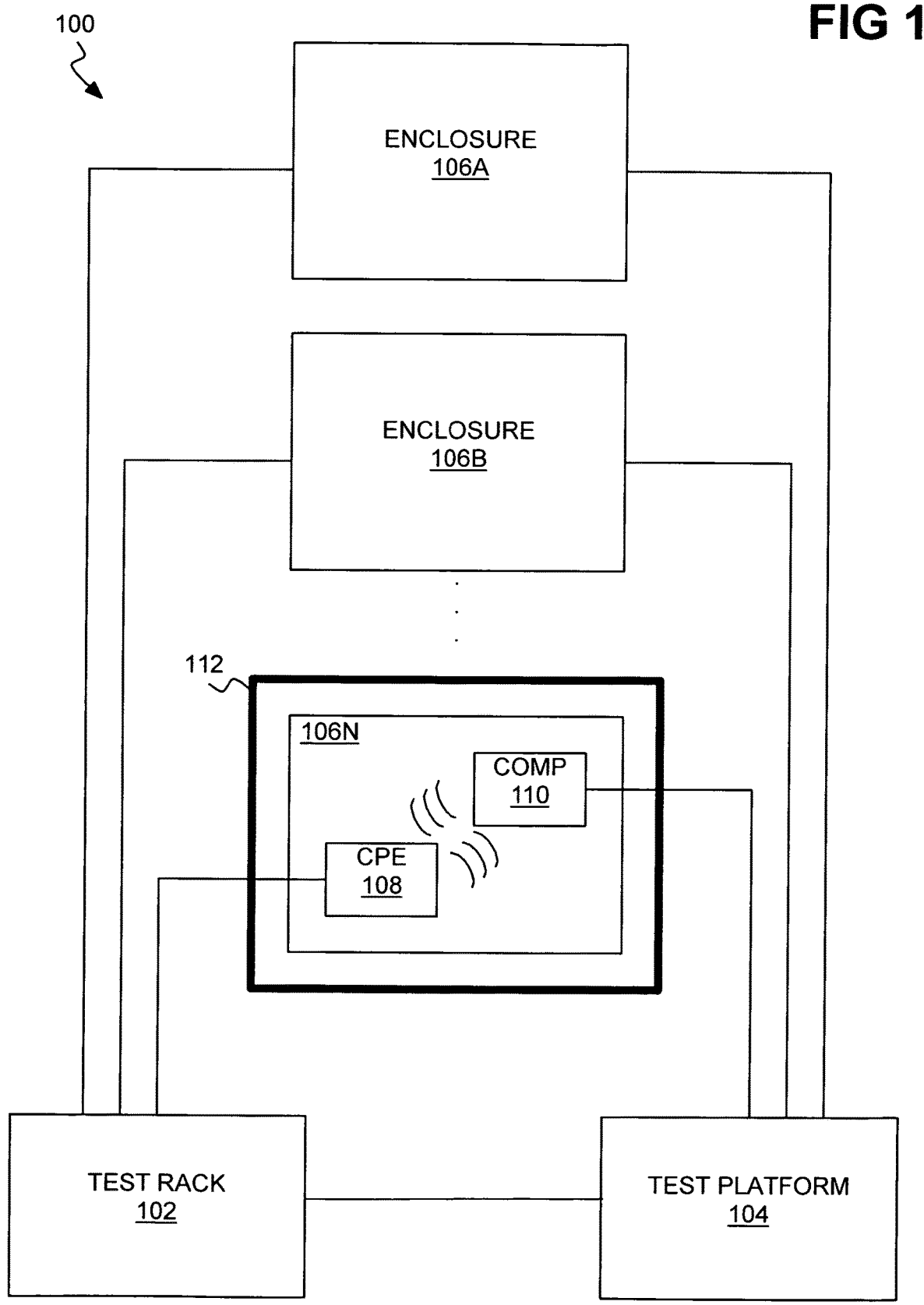
FIG. 1 is a diagram of an example system by which multiple wireless consumer premises equipment (CPE) devices are tested.

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure.

As noted in the background section, service providers deploy customer premise equipment (CPE) devices for the use by their customers. Service providers face an operational issue of managing their stock of new and used CPE devices and maximizing the investment in these CPE devices. Thousands of CPE devices may have to be tested on a daily basis. This issue is referred to as a high-volume device testing issue.

When the CPE devices include wireless network interfaces there are unique challenges for service providers with respect to testing many devices in a high volume device-testing environment. By design, wireless gateways, wireless cable modems, and wireless routers supply an access point for computers, tablets, smart phones and other devices to connect to the wireless network. In general, a single wireless device located in one location will satisfy the connectivity needs of all users in that location.

From the reverse logistics perspective of service providers, hundreds of wireless devices have to be tested in a high-volume testing environment. This means that all devices under test are operating at the same time. However, when many wireless devices are operating in the same physical space, they compete with each other for use of the wireless bandwidth, producing interference and saturation of the wireless network channels allocated for wireless communication. This saturation and interference can hamper communication between the test platform and the devices under test. This situation will lead to false failures of the devices under test.

Techniques disclosed herein address this need for a solution to address channel saturation and interference issues in order to support high-volume processing of wireless devices. Specifically, the techniques disclosed herein solve the channel saturation and interference issues that occur when many wireless network devices are processed in a high-volume device-testing environment. In general, an enclosure, or workspace, is provided for isolating the wireless communications of each CPE device, and many such enclosures can be provided on a multiple-device test platform. With such isolation of the wireless communications, and lack of interference or saturation on the test platform as a whole, a high-volume, scalable wireless test environment is achieved. Each CPE device is thus isolated inside an enclosure that has electromagnetic shielding to block extraneous wireless communication and interference with the wireless device under test, while still permitting wireless testing of the CPE device inside the enclosure.

CPE devices that use wireless interfaces, called wireless CPE devices or wireless devices herein, may be tested and verified to be operational by using a wireless testing platform for simulating operating conditions of the environment in which the wireless devices are intended to operate. Wireless devices, such as wireless cable modems, wireless digital subscriber loop (DSL) modems, wireless gateways, and wireless routers may be treated as commodities that are verified to behave as the customer intends within an operational environment that may be associated with the customer's premises, and related to the service they subscribe to from the content service provider. The wireless testing platform is a specific instance of a universal platform for test and verification of CPE devices.

Wireless device testing is performed by the platform by establishing a connection between a test computer controlled by the platform and the device under test. Parallel testing occurs when the platform manages many test computers connected to many devices under test. Besides controlling the test computers, the platform also controls the operation of the wireless devices under test. Thus, the platform configures the device to operate a wireless network in a specific wireless channel, and to use other specific parameters or identifiers associated with the wireless network it creates and operates, and therefore, the platform can direct testing processes toward the device using the wireless connection it establishes in conjunction with the device.

High volume device testing of wireless devices may test and verify many wireless devices at the same time when a specific test process is employed that overcomes wireless network saturation caused by operating many wireless devices in the small space of the wireless testing platform.

Under conditions of high volume device testing of wireless devices, any wireless devices in operation within 100 feet (or more) of the platform may interfere with the testing functions, and thereby degrade the test environment or introduce false test results for the tests of specific devices. The invention provides a mechanism, multiple shielded enclosures, to specifically minimize the interference caused by the normal operation of a wireless device while it is under test.

FIG. 1 shows an example system 100. The system 100 includes a test rack 102, a test platform 104, and multiple enclosures 106A, 106B, . . . , 106N, which are collectively referred to as the enclosures 106. One such enclosure 106N is shown in detail in FIG. 1 as representative of each of the enclosures 106. The test rack 102 is communicatively connected to the test platform 104. The test rack 102 is communicatively interconnected with a CPE device 108 installed within the enclosure 106N, such as via a wired communication by using a network cable. The system 100 includes a wireless component 110 mounted within the enclosure 106N. The wireless component 110 wirelessly communicates with the CPE device 108 inside the enclosure 106N. The enclosure 106N is openable so that the CPE device 108 may be installed therein or removed therefrom, and is closable so that the CPE device 108 can be tested after having been installed inside.

The enclosure 106N has electromagnetic, or wireless, shielding 112 to inhibit external wireless network signals from entering the enclosure 106N, and also inhibit the CPE device 108 under test that is inside the enclosure 106N from interfering with other wireless CPE devices under test on the test platform 104. Thus, the wireless shielding of an ach enclosure permits the wireless component mounted within the enclosure and the wireless CPE device installed within the enclosure to wirelessly communicate with one another without being affected by the wireless interference outside the enclosure and without permitting the wireless signals exchanged between the wireless CPE device and the wireless component from exiting the enclosure. The shielding 112 may be disposed on the outside of the enclosure 106N, as in FIG. 1, on the inside of the enclosure 106N, or may be an integral part of the material from which the enclosure 106N is itself made.

The test platform 104 thus tests the wireless CPE device 108 installed in the enclosure 106N by controlling and communicating with the CPE device 108 via the test rack 102, and by controlling and communicating with the wireless component 106N. The CPE device 108 can be tested as a wireless client by controlling the wireless component 106N as a wireless access point. The CPE device 108 can be tested as a wireless access point by controlling the wireless component 106 as a wireless client.

FIG. 2 shows an example wireless component 200 that can implement the wireless component of each of the enclosures 106 of FIG. 1. Specifically, the wireless component 200 is an antenna, or antenna element, 202. The antenna 202 is thus placed inside an enclosure along with the wireless device under test. The antenna element included inside the enclosure acts as an extension of the test platform's wireless testing interface, and therefore, while wireless interference is blocked by the enclosure, the actual wireless communications needed for testing is still operating inside the enclosure.

It is noted that the test platform has its own wireless antenna to act as a wireless client or a wireless access point. The platform's wireless antenna is the physical media that allows a wireless connection to exist between the test platform and the device under test, regardless of what role the device under test acts (i.e., as a wireless client or as a wireless access point). The wireless signal communicated through the antenna is relayed to the test platform in at least two ways. First, the antenna (of the test platform) is made to extend, and/or be distributed, such that it may coexist within the enclosure of the device under test. This extension and distribution of the antenna of the test platform is performed via a radio frequency (RF), or antenna, cable 204 that matches the characteristics of the antenna 202.

FIG. 3 shows another example wireless component 300 that can implement the wireless component of each of the enclosures 106 of FIG. 1. Specifically, the wireless component 300 includes a wireless bridge 302 and an antenna 304. The wireless bridge 302 is a device that converts wireless network signals to wired network signals, and vice-versa. The antenna 304 may be internal to the bridge 302, or as depicted in the example of FIG. 3, external to the bridge 302. The antenna receives and sends wireless network signals in relation to the bridge 302.

Thus, the test platform 104 can be connected to multiple wireless components communicating therewith via network cables, such as Ethernet cables, like the network cable 306 in FIG. 3. Each wireless component is co-located with a corresponding CPE device under test within an enclosure. Thus, such a wireless component 300 wirelessly connects to the wireless antenna of the CPE device under test. This physical configuration can be better for high-volume CPE device testing because shared media (e.g., an Ethernet switch with forty-eight ports or more) may be used to accommodate more CPE devices.

The techniques disclosed herein benefit from a hardware configuration of a test platform that specifically supports wireless devices in a high-volume device testing environment. The test platform supplies the overall hardware component configuration of test racks, interface connections, computer workstations or servers, and other network devices, all of which include the physical architecture of the system, and in conjunction with which the disclosed techniques are operative, permitting high-volume testing of wireless devices.

As noted above, the test platform is connected to test racks that allow space for both the devices as well as the electromagnetic shielded enclosures, and the interfaces to connect multiple wireless devices that are going to be tested (inside the enclosures) along with the wireless antennas or wireless interfaces that will join the devices in the enclosures.

The techniques disclosed herein can use networking technologies such as Ethernet, effectively transforming wireless communications into wired Ethernet packets communicating the same information. This configuration allows each wireless interface and enclosure pair to connect to the test platform via one or more Ethernet switches. This physical configuration is better for high-volume device testing because shared media (i.e., Ethernet switch) can be important for the test platform to be able to accommodate more devices.

The techniques disclosed herein thus involve specific hardware and a configuration of a test platform in accordance with testing wireless devices. The techniques disclosed herein can employ processes described in the related applications referenced above that operate in conjunction with the hardware features of the test platform and of the specific techniques that shield the antennas/wireless interfaces and the devices under test from wireless network channel saturation and interference. The referenced processes implement functional verification methods on many wireless devices under test.

FIG. 4 shows an example method 400 for testing CPE devices. Which of the enclosures are closed is determined (402). For instance, a sensor at each enclosure may be employed. Then, just the CPE devices that are within closed enclosures are tested (404). This process provides for testing high volumes of wireless networking devices without allowing wireless network channels to become saturated, or to experience interference. For example, by using a sensor to determine that an enclosure is not closed, the process can remove that specific device from the parallel test process because its operation "in the open" would otherwise impact testing of other devices in the parallel pool. That is, the test process specifically is aware of wireless network operation issues, and therefore, accommodates operation approaches that minimize wireless interference and wireless channel saturation.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

I claim:

1. A system comprising:
   a customer premises equipment (CPE) testing platform;
   a CPE testing rack communicatively connected to the CPE testing platform and receptive to communication with a plurality of wireless CPE devices;
   a plurality of enclosures communicatively connected to the CPE testing rack, each enclosure having wireless shielding to reduce outside wireless interference from entering the enclosure and to reduce wireless signals within the enclosure from exiting the enclosure, each enclosure receptive to installation therein a corresponding wireless CPE device and comprising a first cable for communicatively interconnecting the corresponding wireless CPE device to the CPE testing rack; and
   a plurality of wireless components, each one of the wireless components of the plurality of wireless components being communicatively connected to the CPE testing platform by a second cable, each wireless component mounted within a corresponding enclosure to wirelessly communicate with the corresponding wireless CPE device installed within the corresponding enclosure.

2. The system of claim 1, wherein the wireless shielding of each enclosure permits the wireless component mounted within the enclosure and the wireless CPE device installed within the enclosure to wirelessly communicate with one another without being affected by the wireless interference outside the enclosure and without permitting the wireless signals exchanged between the wireless CPE device and the wireless component from exiting the enclosure.

3. The system of claim 1, wherein each wireless component is a wireless antenna and each second cable is an antenna cable.

4. The system of claim 1, wherein each wireless component comprises:
   a wireless bridge that converts wired network signals to wireless network signals and vice-versa, and that is communicatively connected to the CPE testing platform using the second cable over which the wired network signals are received and sent; and
   a wireless antenna communicatively connected to the wireless bridge to receive and send the wireless network signals.

5. The system of claim 1, wherein, for each enclosure, the CPE testing platform tests the wireless CPE device installed in the enclosure by controlling and communicating with the wireless CPE device installed in the enclosure via the CPE testing rack and by controlling and communicating with the wireless component mounted in the enclosure.

6. The system of claim 5, wherein, for each of at least one of the enclosures, the CPE testing platform tests the wireless CPE device installed in the enclosure as a wireless client by controlling the wireless component mounted in the enclosure as a wireless access point.

7. The system of claim 5, wherein, for each of at least one of the enclosures, the CPE testing platform tests the wireless CPE device installed in the enclosure as a wireless access point by controlling the wireless component mounted in the enclosure as a wireless client.

8. An apparatus comprising:
an enclosure receptive to installation of a wireless customer premises equipment (CPE) device therein, the enclosure comprising a first cable and a second cable separate and distinct from the first cable, wherein the first cable is configured to communicatively couple the wireless CPE device to a CPE testing rack;
wireless shielding to reduce outside wireless interference from entering the enclosure and to reduce wireless signals within the enclosure from exiting the enclosure; and
a wireless component mounted within the enclosure to wirelessly communicate with the wireless CPE device installed within the enclosure, wherein the second cable is configured to communicatively couple the wireless component to a CPE testing platform that is external to the enclosure and communicatively coupled to the CPE testing rack.

9. The apparatus of claim 8, wherein the wireless shielding permits the wireless component mounted within the enclosure and the wireless CPE device installed within the enclosure to wirelessly communicate with one another without being affected by the wireless interference outside the enclosure and without permitting the wireless signals exchanged between the wireless CPE device and the wireless component from exiting the enclosure.

10. The apparatus of claim 8, wherein the wireless component is a wireless antenna that is connected external to the enclosure using the second cable, and wherein the second cable is an antenna cable.

11. The apparatus of claim 8, wherein the wireless component comprises:
a wireless bridge that converts wired network signals to wireless network signals and vice-versa, and that is connected external to the enclosure using a network cable over which the wired network signals are received and sent; and
a wireless antenna communicatively connected to the wireless bridge to receive and send the wireless network signals within the enclosure.

12. A method comprising:
for a plurality of wireless customer premises equipment (CPE) devices installed within corresponding enclosures that are wirelessly shielded and in which wireless components are mounted,
communicatively connecting each wireless CPE device of the plurality of wireless CPE devices to a CPE testing rack with a respective first cable; and
testing, using a CPE testing platform external to the corresponding enclosures that is connected to the wireless CPE devices via the CPE testing rack and respective first cables and connected to the wireless components via respective second cables by communicating with the wireless CPE devices and the wireless components within the enclosures to direct respective wireless CPE devices and wireless components to communicate wirelessly.

13. The method of claim 12, wherein each one of the enclosures comprises a sensor for determining whether the enclosure is closed.

14. The method of claim 12, wherein wireless shielding of each enclosure permits the wireless component mounted within the enclosure and the wireless CPE device installed within the enclosure to wirelessly communicate with one another without being affected by the wireless interference outside the enclosure and without permitting the wireless signals exchanged between the wireless CPE device and the wireless component from exiting the enclosure, when the enclosure is closed.

15. The method of claim 12, wherein, for each of at least one of the enclosures that are closed, the CPE testing platform tests the wireless CPE device installed in the enclosure as a wireless client by controlling the wireless component mounted in the enclosure as a wireless access point.

16. The method of claim 12, wherein, for each of at least one of the enclosures that are closed, the CPE testing platform tests the wireless CPE device installed in the enclosure as a wireless access point by controlling the wireless component mounted in the enclosure as a wireless client.

* * * * *